United States Patent [19]

Guckenberger

[11] Patent Number: 5,158,499
[45] Date of Patent: Oct. 27, 1992

[54] LASER SCORING OF PACKAGING SUBSTRATES
[75] Inventor: Anthony Guckenberger, Appleton, Wis.
[73] Assignee: American National Can Company, Chicago, Ill.
[21] Appl. No.: 720,121
[22] Filed: Jul. 1, 1991

Related U.S. Application Data
[63] Continuation-in-part of Ser. No. 550,738, Jul. 9, 1990, abandoned.
[51] Int. Cl.⁵ .............................................. B65D 85/84
[52] U.S. Cl. .............................. 206/524.2; 206/484.2; 206/484; 383/207; 383/209
[58] Field of Search ................. 206/524.2, 484, 484.2; 383/207, 209, 121, 109, 122, 120; 219/121.65, 121.69, 121.85

[56] References Cited
U.S. PATENT DOCUMENTS
3,909,582 9/1975 Bowen .
4,549,063 10/1985 Ang et al. .
4,681,781 7/1987 Murray et al. .

FOREIGN PATENT DOCUMENTS
0357841 3/1990 European Pat. Off. .
2803074 7/1979 Fed. Rep. of Germany ...... 383/121
973109 10/1964 United Kingdom ................ 383/121

Primary Examiner—William I. Price
Attorney, Agent, or Firm—Robert A. Stenzel

[57] ABSTRACT

An easy open pouch having superimposed layers of film and at least two substantially parallel and linear laser scores located adjacent to at least one seal.

27 Claims, 5 Drawing Sheets

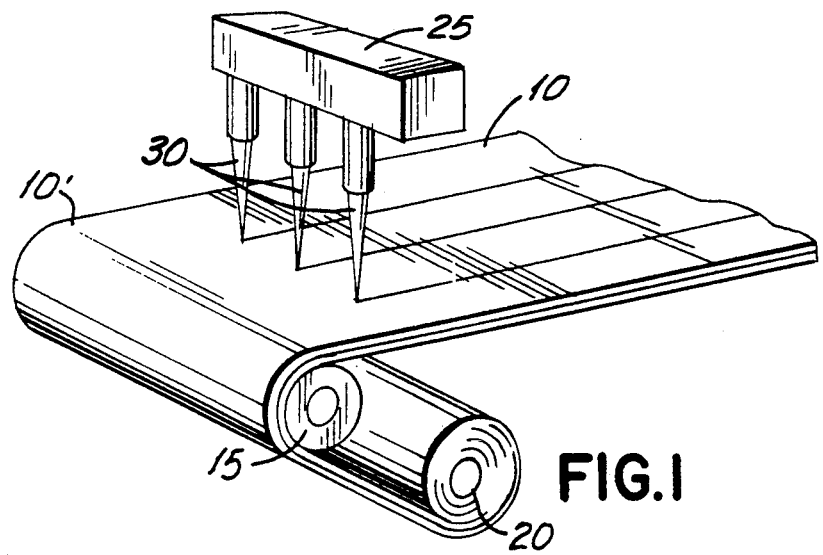
FIG.1
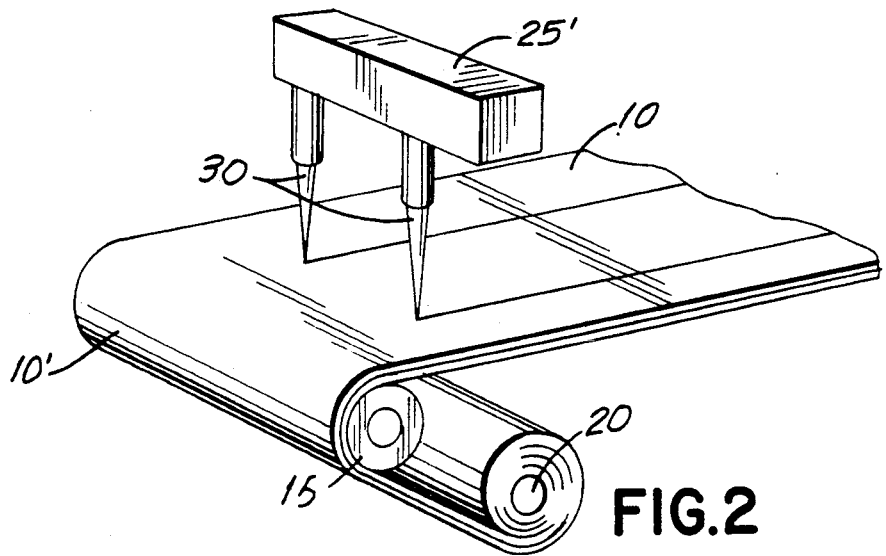
FIG.2
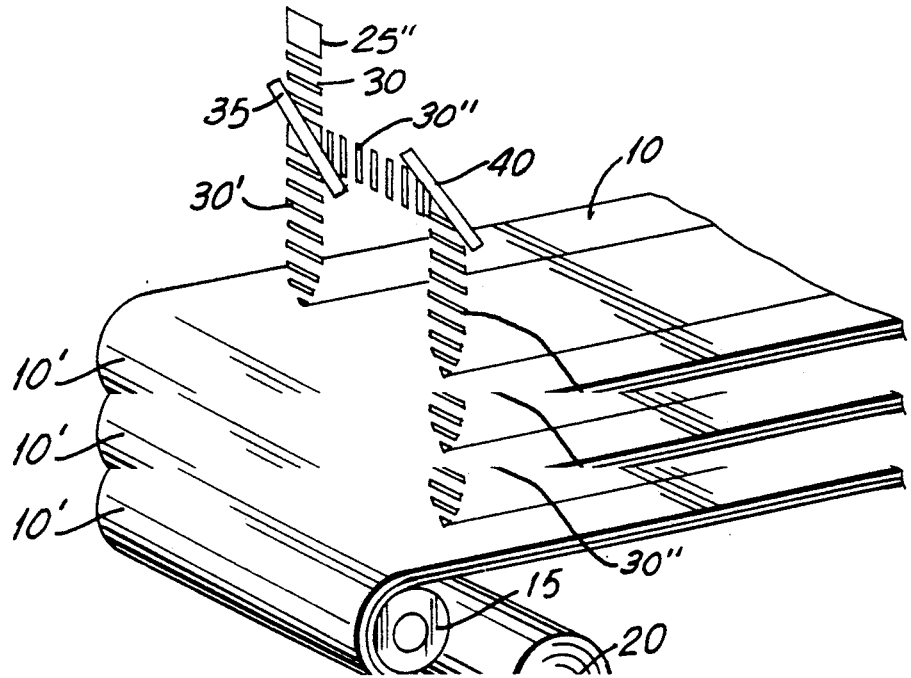

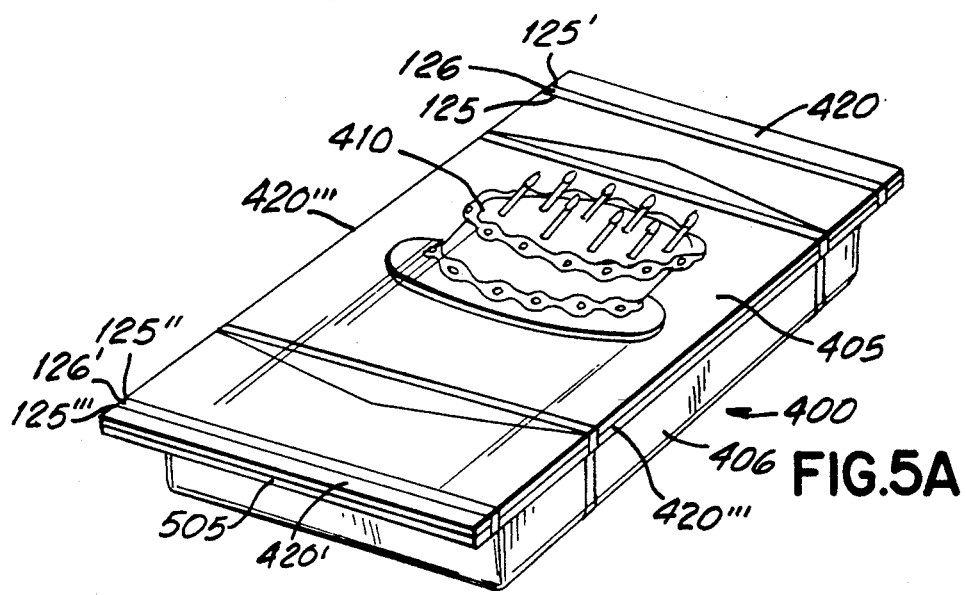
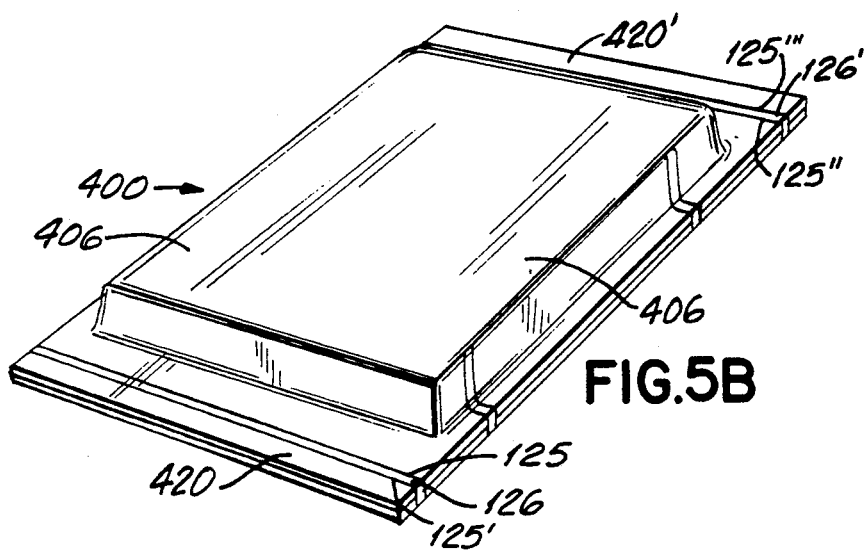
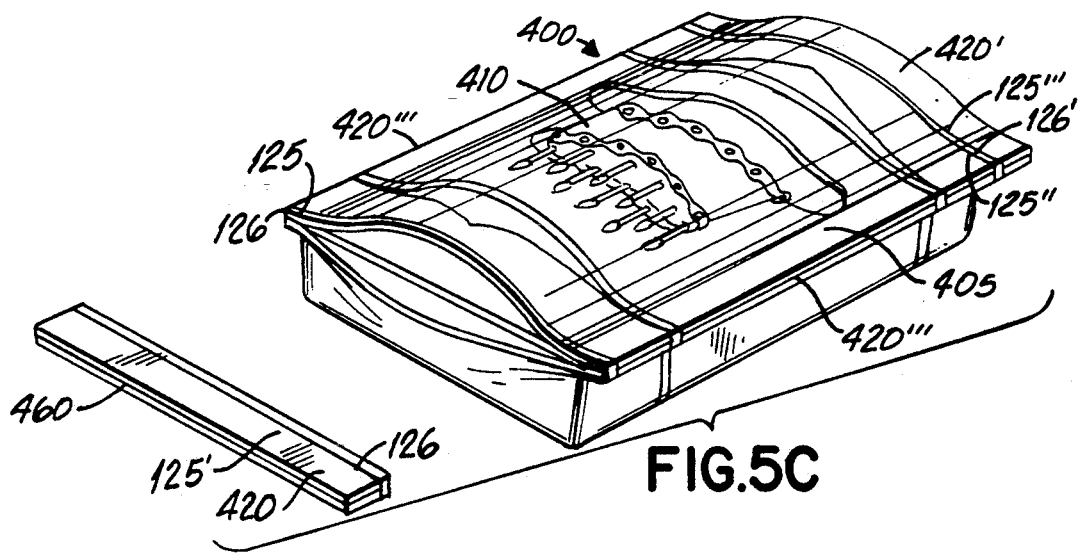

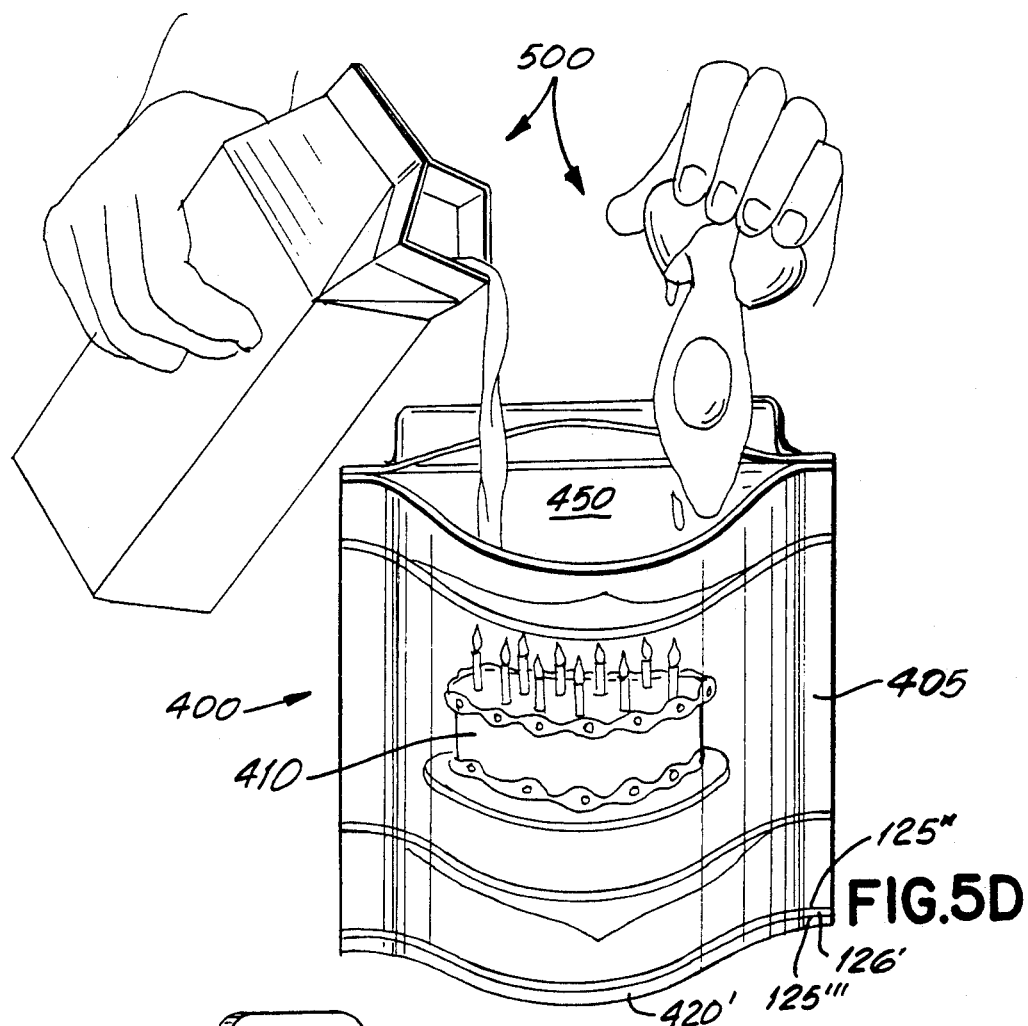
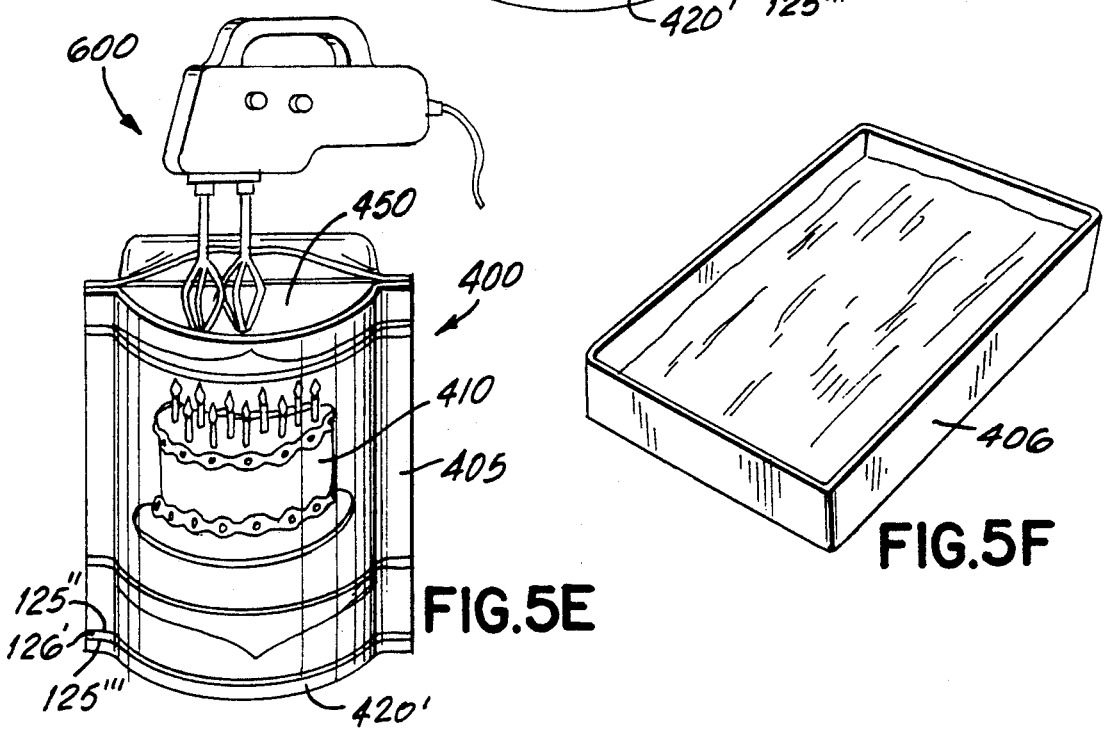

LASER SCORING OF PACKAGING SUBSTRATES

RELATED APPLICATIONS

This application is a continuation-in-part of U.S. application Ser. No. 07/550,738, filed Jul. 9, 1990, now abandoned incorporated herein by reference.

FIELD OF THE INVENTION

This invention relates to packages, e.g., pouches; and, this invention relates to laser scoring of packaging substrates, e.g., providing two or three parallel laser scores so that the package has an easy-open feature.

BACKGROUND OF THE INVENTION

Films or sheets of polymeric barrier materials are formed into a finished package or "film package" such as a pouch by various techniques. For instance, by forming heat or adhesive seals about the periphery of the shape to be formed into a pouch. For example, if a square pouch is desired, a rectangular film twice the desired length of the pouch is folded, the two parallel sides of the periphery (perpendicular to the fold) heat or adhesive sealed, or, the two parallel sides and the fold are heat or adhesive sealed, the food or other material to be packaged inserted therein, and then the remaining open side of the periphery is heat or adhesive sealed. Another method for making a pouch is by sealing on three sides face-to-face films, filling the thus formed open pouch with food or whatever material is to be packaged therein, and then sealing the fourth side. For background on pouches or bags and their production, reference is made to U.S. Pat. Nos. 4,190,477, 4,311,742, 4,360,550, 4,424,256 and 4,557,377, each of which being hereby incorporated herein by reference.

With respect to means for opening pouches or packages, or to laser scoring, or to laminate structures, reference is made to the following:

U.S. Pat. Nos. 3,313,642, 3,404,988, 3,608,815, 3,626,143, 3,693,785, 3,790,744, 3,909,582, 3,925,591, 3,986,640, 4,172,915, 4,217,327, 4,236,652, 4,356,375, 4,407,873, 4,543,279, 4,549,063, 4,557,377, 4,571,340, 4,656,094, 4,698,246, 4,762,514, 4,765,999, 4,778,058, 4,784,885, 4,785,937, 4,788,105, 4,808,421, 4,834,245, 4,880,701, 4,894,115, 4,934,245; and, Japanese Utility Model Publications Nos. 54-22484 and 51-48775. Reference is also made to U.S. Pat. No. 4,681,781, German Patent Document 2803074, UK 973,109 and EPA 0357841, of record in predecessor application Ser. No. 07/550,738.

The problem encountered by the end user of the food or material within the pouch is how to open the pouch. The pouches are usually formed from tough or strong polymeric barrier materials so the pouches do not open easily. One method for opening such pouches is to manually rip at the pouch which usually results in its contents spilling all about. Another method is simply cutting open the pouch with a scissor, knife or other sharp object. It is desirable to be able to neatly open a pouch without the need to use a cutting instrument. Furthermore, the problem of how to open a pouch is really two-fold: The first problem is how to initiate the opening. The second problem is providing control of the opening across the entire pouch.

To meet this desire of being able to open a pouch without a cutting instrument, some have proposed packages having an opening notch such V - or I - shaped notch or notches, or a tearing zone, see e.g., U.S. Pat. Nos. 4,934,245, 3,404,988. U.S. Pat. No. 3,693,785 relates to a wrapping material containing regenerated cellulose which has a portion thereof which is more frangible than the remainder thereof. Likewise, U.S. Pat. No. 3,986,640 deals with a flexible package having a cut pattern, which when bent along the cut pattern, causes the package to open and the flowable contents therein to dispense. U.S. Pat. No. 4,217,327 relates to forming a score line along a predetermined line in the surface of a plastic film to form a tear line. And, U.S. Pat. No. 4,236,652 relates to a package having a cut score area to rupture open the package upon bending.

These previous proposals have not overcome the problem. Notches, cut patterns or tear lines can produce an opening which is easily propagated without any control. Further, notches, cut patterns or tear lines produce areas of weakness in the package, which, when stressed accidentally, e.g., during handling or shipping, can become an unintended opening which is easily propagated. That is, these proposals have not adequately resolved the problem of initiating an opening only when desired and of controlling the opening across the entire package.

Furthermore, these proposals have presented manufacturing problems. For instance, the problem of properly locating the notch, cut pattern or tear line in a position where the consumer desires to open the package. If not properly positioned, the resulting package can be worse than if no such notch, cut pattern or tear line had been provided: The consumer must still resort to a sharp object to open the package, but it is weakened at some point (due to the mispositioned notch, cut pattern, or tear line). In addition, opening features such as those on cigarette packs require a separate opening tape which means that it is more costly to manufacture the package because it requires a separate material (the tape) and a complicated process.

Roughening an area of the package is another type of proposal to open a package without the need for a cutting instrument. U.S. Pat. No. 3,313,642 relates to a process of modifying the surface properties and polyolefin film.

U.S. Pat. No. 4,778,058 provides a pouch from a film of two plastic layers. A discreet area of the first layer, corresponding to a folded portion of the resultant pouch, is surface roughened prior to lamination to the second layer. The irregularities from roughening are filled with the plastic material of the second plastic layer. The film of the two layered film is heat-sealed into a pouch. The surface roughening is at a position on the first layer of the film other than the portion thereof to be heat sealed. While U.S. Pat. No. 4,778,058 may provide for tear initiation, it still fails to provide for control of the tear as is desired by the end user.

U.S. Pat. No. 4,543,279 relates to a film product, such as a sealed bag, wound film or adhesive tape, having a plurality of random scratches or cuts formed along the edges and oriented toward the other side of the film. In a bag of U.S. Pat. No. 4,543,279, the scratches are formed on the longitudinal edge portion of the bag, outside of the seals thereof, or on the longitudinal edge portion outside of the seal and a central line inside the seal. While placing scratches on a central line inside the seal may provide for tear initiation, the placement of the scratches outside of the seals may not adequately provide for tear initiation as the user must still rip through the seals. And, no provision is made for tear control.

U.S. Pat. No. 3,608,815 relates to an opening aid for packages made from at least one oriented material. The opening aid consists of minutely expanding the oriented material at a plurality of points within an area pattern which will be a fold of the package. U.S. Pat. No. 3,608,815 simply provides tear initiation like the previously discussed notch or cut techniques. However, U.S. Pat. No. 3,608,815 chalks up tear control to the nature of the materials of the package, stating that oriented materials "tear in an essentially straight line" while cellophane will tear without directional control. Thus, U.S. Pat. No. 3,608,815 does not adequately provide tear control.

Japanese Utility Model Publication No. 54-22484, published Aug. 6, 1979 (Application No. 50,68727 dated May 23, 1975; Early Disclosure No. 51-150915, dated Dec. 2, 1976), relates to a bag having seals with tear-initiating lines. The tear initiating lines consist of ordered, successively smaller pinholes or notches extending from the outer edge of the seal and terminating at the center of the seal so that the inner half of the seal is the same as an ordinary seal. It is stated in this publication that the holes or notches are not to extend all the way into the enclosed part of the bag, i.e., across the entire width of the seal, because to do so will impair the strength and the airtightness of the seal. Further, this publication poses manufacturing problems which it leaves unaddressed. To effect the tear-initiating line, the films of the bag must be selectively cut or notched: The cuts or notches are organized along lines and are of varying size and extend only through one-half of the seal. Thus, this publication calls for a very complicated manufacturing process.

Japanese Pat. Publication No. 51,48775, published Dec. 22, 1976 (Application No. 49-49804 dated May 7, 1974; Early Disclosure No. 51-16346, dated Feb. 9, 1976), deals with placing minute scars, embossment or scratches along the center line of a laminate plastic film which is then slit lengthwise along the center line to make two adhesive tapes. The problems of tear initiation and tear control in the opening of packages are not addressed in this publication.

Bowen, U.S. Pat. Nos. 3,909,502 and 3,790,744, Fry, U.S. Pat. No. 3,626,143, Ang, U.S. Pat. No. 4,549,063, Josephy, U.S. Pat. No. 4,356,375 and Yoshida, U.S. Pat. No. 4,762,514 all relate to laser scoring and each of these U.S. Patents is hereby incorporated herein by reference.

Bowen, U.S. Pat. No. 3,790,744 relates to forming one line of weakness in at least one but not all layers of a multilayer structure by preferentially vaporizing with a beam of radiant energy a line in at least one layer which is not the most proximate layer in relation to the source of radiant energy. Bowen, U.S. Pat. No. 3,909,582, deals with forming a line of weakness defining a tear path in a multilayer laminate by scoring with a beam of radiant energy the most proximate layer in relation to the source of radiant energy. While these patents may speak of forming one or more lines of weakness or at least one line of weakness, neither of these patents indeed teaches or suggests forming a plurality, e.g., two or three, parallel, laser scores to provide the easy-open feature of the present invention. Further, neither of these Bowen patents teaches or suggests the multilayer laminates of the present invention, or the manufacturing advantages of the present invention.

Fry, U.S. Pat. No. 3,626,143, similarly relates to focusing a single beam of laser light upon a thermoplastic substrate so as to form a single score. Fry fails to teach or suggest forming a plurality of parallel scores, or the laminates or advantages of the present invention.

Ang, U.S. Pat. No. 4,549,063 deals with forming a crack and peel feature on the backing of an adhesive laminate by providing the backing with one or more non-linear, discontinuous, preferably sine-wave geometric pattern, lines, preferably by a laser. Ang fails to teach or suggest forming a plurality of parallel, linear or substantially straight, and preferably continuous scores as herein to provide an easy-open feature to a package; and, Ang fails to teach or suggest the laminates and advantages of the present invention. Josephy, U.S. Pat. No. 4,356,375, also relates to forming a line of weakness in the protective backing of an adhesive laminate, and suffers from the same deficiencies of Ang, Fry and Bowen.

Yoshida, U.S. Pat. No. 4,762,514 deals with laser scoring a beverage pouch in a particular pattern to facilitate rupture to introduce straw, e.g., scores in an "X" shape, on a "Y" or a star shape or a series of parallel cuts. However, this patent fails to teach or suggest a package such a pouch having a plurality of parallel, linear or substantially straight scores which extend across the entire width of the package, near or adjacent to a seal thereof, to provide an easy-open tear feature on said package as provided for herein; and, Yoshida fails to teach or suggest the laminates and advantages of the present invention.

Eichelberger, U.S. Pat. No. 4,894,115, incorporated herein by reference, is concerned with the fabrication of integrated chip assemblies having a dielectric polymer layer thereover which is laser-scored to access the chip for electrical connections. This patent is disclosed and incorporated herein because it deals with a use of a laser, but, it is not considered pertinent and is considered non-analogous to the present invention.

The remaining patents disclosed herein deal with diverse multilayer packaging laminates, and, either individually or in any combination fail to teach or suggest the laminates or advantages of the present invention. Certain of these patents, e.g., U.S. Pat. Nos. 4,407,873, 4,785,937, 4,808,421 or 4,571,340 may mention retortable, microwaveable or ovenable containers, but do not disclose or suggest the mix and bake pouch of the present invention.

Thus, heretofore, a package, preferably a pouch, having an easy-open tear feature comprising a plurality of linear, or substantially straight, e.g., two or three preferably continuous laser scores extending across the entire width of said pouch and preferably disposed near or adjacent to a seal thereof, has not been disclosed or suggested. Nor has such a scored pouch from a multilayer structure, e.g., a laminate, comprising from outer layer to inner layer, Polyester/Polyethylene/Polyester/Polyethylene, e.g. white block polyethylene/coextrusion sealant film, e.g., at least one layer high density polyethylene, e.g., white colored/linear low density polyethylene wherein the scores can extend through the first two layers of polyester and polyethylene, but not through the third, or internal, polyester layer, been disclosed or suggested.

Nor has a structure comprising (outer) polyester/polyethylene/high density polyethylene/linear low density polyethylene (inner) been disclosed or suggested. Nor has such a structure in the form of a pouch having a plurality of linear, or substantially straight, preferably continuous laser scores extending across the entire width of said pouch and disposed near or adjacent to a seal thereof, been disclosed or suggested.

Further, a large pouch, having an easy-open tear feature of a plurality of parallel, linear or substantially straight, preferably continuous scores extending across the entire width of said pouch, wherein one can mix ingredients, e.g., cake mix, such as with a mixer; and, once mixed, rip away the top portion of the pouch using the score lines and then employ the remainder of the pouch as a pan to bake in, has not been disclosed or suggested.

It is therefore an object of this invention to provide the pouches and multilayer structures or laminates which have heretofore not been disclosed or suggested. It is also an object of this invention to provide manufacturing advantages from the application of a plurality of parallel, linear or substantially straight scores across the entire width of a pouch.

SUMMARY OF THE INVENTION

It has been surprisingly discovered that package machinery alignment, and a package having tear initiation and tear control, result from laser scoring of the package substrate, particularly, by providing at least two substantially, parallel, substantially straight or linear, laser scores across the entire width of such a package substrate.

Thus, the present invention provides an easy-open, tear control package, e.g., a pouch, comprising multilayer or film structure sealed together, e.g. such that the package has a front face and a rear face wherein on the outer surface of the said film structure, e.g., wherein at an isolated area which is to be at least a full width of said package and/or structure and preferably adjacent to or near at least one seal, the said package is laser scored with at least two substantially parallel, substantially straight or linear, laser scores, e.g., laser scoring on front and/or rear faces. If the package has front and rear faces, then between the faces, at one end of the package, preferably at the end opposite the plurality of laser scores (if only one set of laser scores be provided) can be an additional multilayer film structure, adhered to the inner surface of each face so that the package can have an expandable bottom, e.g., open and have volume to it.

The film structure can comprise, from outer layer to inner layer; a first layer comprising polyester, a second layer comprising polyethylene, a third layer comprising high density polyethylene, and a fourth layer comprising linear low density polyethylene. Alternatively, the film structure can comprise, from outer layer to inner layer, a first layer comprising polyester, a second layer comprising polyethylene, e.g., white polyethylene, a third layer comprising polyester, a fourth layer comprising polyethylene, e.g., white polyethylene and/or a block polymer or copolymer of polyethylene, a fifth layer comprising a coextrusion which can be a sealant film comprising at least one high density polyethylene, e.g., orange colored high density polyethylene, and, a sixth layer comprising linear low density polyethylene, e.g., a clear linear low density polyethylene, and, in this alternative embodiment, the laser scores preferably cut through the first or through the first and second layers, but not through the third layer (i.e., not through the internal layer comprising polyester).

The film structures of this invention can also comprise:

(i) PET/INK/LDPE/PET/LDPE/Coextrusion of HDPE, HDPE, LLDPE; or PET/LDPE/PET/LDPE/Coextrusion of HDPE, HDPE, LLDPE;

(ii) PET/Coextrusion of LDPE, EAA/Foil/EMA; or PET/INK/Coextrusion of LDPE,EAA/Foil/Primer/EMA;

(iii) Polypropylene (e.g., OPP)/INK/Coextrusion of LDPE, LDPE/Coextrusion of HDPE, HDPE, LLDPE; or Polypropylene (e.g., OPP)/Coextrusion of LDPE, LDPE/Coextrusion of HDPE, HDPE, LLDPE;

(iv) Polypropylene (e.g., OPP)/INK/LDPE/Coextrusion of HDPE, HDPE, LLDPE; or Polypropylene(e.g., OPP)/LDPE/Coextrusion of HDPE, HDPE, LLDPE;

(v) HDPE/HDPE/LLDPE, e.g., by Coextrusion.

And, in these embodiments the laser scores extend down into the structure an appropriate depth. For instance in (i) the laser scores preferably extend to but not through the first LDPE layer (The third layer of the alternative with ink, the second layer of the alternative without ink). In (ii) the laser scores preferably extend to but not through the first PET layer. In (iii) the laser scores preferably extend to but not through the Polypropylene layer. In (iv) the laser scores can extend to but not through either the polypropylene layer or the first LDPE layer (third or second layer of structure). In (v), the laser scores can extend to but not through either the first or second HDPE layer. In this instance, the term extend to but not through means that the laser scores can cut into the layer somewhat but not all the way through, e.g., in (i) the scores may extend up to three quarters through the first LDPE layer, and, likewise for embodiments (ii)–(v).

The present invention also provides methods for making easy open packages, preferably pouches, comprising forming multilayer or film structure for a package and laser scoring the same. If the package has front and rear faces, then the method includes sealing together those faces so that the package has a front face and a rear face, and then laser scoring an outer surface of said film structure. The laser scoring in the method of this invention is at an isolated area which is: a full width of the package, preferably adjacent to or near at least one seal, and if the package has front and rear faces, on the front face and/or rear face when said film structure is sealed together to form the said package; said laser scoring being such to provide at least two substantially parallel, substantially straight or linear laser scores. The multilayer film structure for the front and rear faces are preferably joined, i.e., aligned face-to-face and sealed on three sides prior to scoring; these faces, in the mass production of such packages, are aligned and sealed as a plurality of packages in roll form. The rolls are then passed under the laser or lasers for the scoring.

The packages of this invention can be used for any purpose, e.g., pouches or containing beverages such as citrus juices, e.g, orange juice, or concentrates thereof; or, as packaging for soap. The packages of this invention can also take the form of a large pouch with a mix contained therein, e.g., a cake mix; the pouch has a plurality of laser scores at each end of it. The user can open one end of the pouch by tearing at the laser scores at a first end. Ingredients can then be added into the open pouch, e.g., eggs, milk, water, butter, oil or the like; and, the ingredients can even be admixed in the pouch. After adding and mixing, if necessary, the end user can rip at the second set of scores and the remainder of the package can then be used as a cooking pan to bake the ingredients (e.g., into a cake).

BRIEF DESCRIPTION OF DRAWINGS

FIGS. 1-3 show apparatus of and for making the present invention.

FIGS. 5A-5F show a package of the present invention, sealed, opened, having ingredients added and mixed therein, and, in the final state as a pan.

DETAILED DESCRIPTION

It has now been surprisingly found that an easy-open tear control package, e.g., a pouch, is easily manufactured by (i) forming, preferably by extruding face-to-face films, or film structure or multilayer structure, preferably comprising polymeric and/or thermoplastic material; (ii) sealing three sides of the face-to-face films with the outer surfaces facing out to form an open package; (iii) laser scoring the outer surface, front and/or rear of said open package at an isolated area which is to be at least a full width of said package, and preferably adjacent to or near a seal, and also preferably on both said front and rear faces, so as to provide at least two substantially parallel, substantially straight or linear laser scores; (iv) filling the thus formed scored open pouch; and (v) sealing the remaining side to form a closed pouch.

Figure 4:
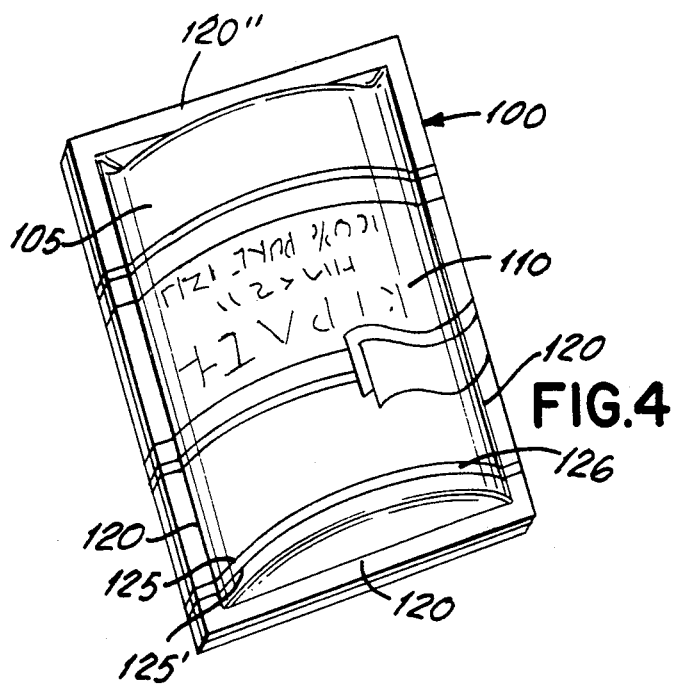
FIGS. 4-4B show packages of the present invention.
Figure 4A:
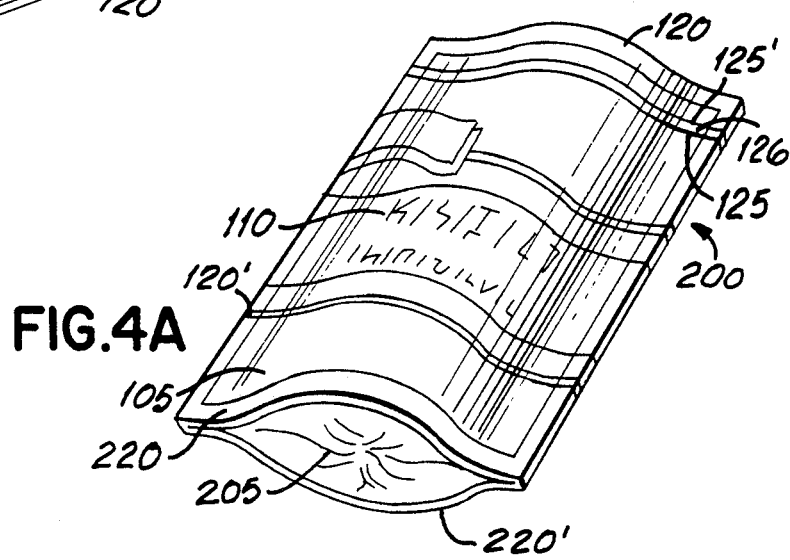

Between the faces, at one end of the package, preferably at the end opposite the plurality of laser scores, if only one set of laser scores is provided, and also preferably opposite the side sealed in step (v), and additional multilayer or film structure can be provided, adhered to the inner surface of each face so that the package can have an expandable side or bottom (See FIG. 4A). This additional film structure can fold between the faces when the open pouch is not filled. Alternatively, this additional multilayer or film structure can be lap sealed to the faces such that the bottom of the pouch is rounded. Thus, between steps (i) and (ii) can be the additional step of forming an additional multilayer or film structure; and, step (ii) can additionally comprise sealing said additional multilayer or film structure to the inner surfaces of each face at or near an end of said package so that the package can open and have volume to it. Steps (i) to (ii) can also and preferably include even providing printing on the pouch, prior to the laser treatment.

The product of steps (i) to (ii) can be manufactured in roll form so that step (iii) can be automated, e.g., as shown in FIGS. 1-3.

The present invention also provides a method of making an easy tear open package comprising a multilayer or film structure from which said package is made by folding and sealing said film structure; and laser scoring said film structure with at least two substantially parallel, substantially straight or linear laser scores so as to provide the package with a tear strip; the laser scoring is performed preferably prior to said film structure being folded and sealed into the form of a package.

The laser scores in this invention can be spaced 1/16", ⅛", or 3/16" apart naturally, the distance may be varied to suit the various purposes of the pouch. The application of the plurality of laser scores in an automated process achieves machinery alignment and provides the resultant package with an easy tear-open feature. In particular, an effective easy tear open feature was not provided when a single laser score was provided to a packaging substrate because, for instance, if the scoring was on the front and rear faces of the package, the side-to-side weave on machines for manufacturing such packages meant that the single scores on the front and rear faces did not align; so, no easy tear open feature. However, it was also found that the weave can offset single scores by approximately 1/16" to ⅛"; thus, the plurality of scores provided for herein provides an easy tear open feature because alignment of scores accordingly results. Bartelt, HMC or other high speed machines are useful for forming packages of this invention. Further, applying a packaging substrate can provide a tear strip feature therefor (See FIG. 6 and 7).

A presently preferred multilayer or film structure for a package of the present invention can comprise, from outer layer to inner layer: a first layer comprising polyester, a second layer comprising polyethylene, a third layer comprising high density polyethylene, and a fourth layer of linear low density polyethylene. Alternatively, the multilayer or film structure can comprise, from outer layer to inner layer, a first layer comprising polyester, a second layer comprising polyethylene e.g., white polyethylene, a third layer comprising polyester, a fourth layer comprising polyethylene, e.g., white polyethylene and/or a block polymer or copolymer of polyethylene, a fifth layer comprising a coextrusion which can be a sealant film comprising high density polyethylene, e.g., orange colored high density polyethylene, and, a sixth layer of linear low density polyethylene, e.g., a clear linear low density polyethylene; and, in this alternative embodiment, the laser scores would cut through the first or through the first and second layers, but not through the third layer (i.e., not through the internal layer comprising polyester). Polyester layers can be not only copolymer of polyester (or CoPET) or from polybutylene terepathalate or copolymers thereof (or CoPBT).

Other preferred structure for the present invention include:
(i) PET/INK/LDPE/PET/LDPE/Coextrusion of HDPE, HDPE, LLDPE; or PET/LDPE/PET/LDPE/Coextrusion of HDPE, HDPE, LLDPE;
(ii) PET/Coextrusion of LDPE, EAA/Foil/EMA; or PET/INK/Coextrusion of LDPE,EAA/Foil/Primer/EMA;
(iii) Polypropylene (e.g., OPP)/INK/Coextrusion of LDPE, LDPE/Coextrusion of HDPE, HDPE, LLDPE; or Polypropylene (e.g., OPP)/Coextrusion of LDPE, LDPE/Coextrusion of HDPE, HDPE, LLDPE;
(iv) Polypropylene (e.g., OPP)/INK/LDPE/Coextrusion of HDPE, HDPE, LLDPE; or Polypropylene(e.g., OPP)/LDPE/Coextrusion of HDPE, HDPE, LLDPE;
(v) HDPE/HDPE/LLDPE, e.g., by Coextrusion.

And, in these embodiments the laser scores extend down into the structure an appropriate depth. For instance in (i) the laser scores preferably extend to but not through the first LDPE layer (The third layer of the alternative with Ink, the second layer of the alternative without Ink). In (ii) the laser scores preferably extend to but not through the first PET layer. In (iii) the laser scores preferably extend to but not through the Polypropylene layer. In (iv) the laser scores can extend to but not through either the polypropylene layer or the first LDPE layer (third or second layer of structure). In (v), the laser scores can extend to but not through either the first or second HDPE layer. In this instance, the term extend to but not through means that the laser scores can cut into the layer somewhat but not all the way through, e.g., in (i) the scores may extend up to three quarters through the first LDPE layer, and, likewise for embodiments (ii)–(v).

In (i) the first layer can be 48ga. LBT PET, the first LDPE layer can be 14#/ream white LDPE, the second PET layer can be 48 gm LBT PET, the second LDPE layer can be 14#/ream Black/White LDPE, and, the Coextrusion can be a 2 mil coextrusion of white HDPE/orange HDPE and LLDPE. In (ii) the PET layer can be 48 ga. LBT PET, the coextrusion can be a first layer of 5#/ream white LDPE and a second layer of 2#/ream EAA, the foil can be 0.00025 to 0.00030 inches thick, and, the EMA can be 10#/ream. In (iii) the polypropylene is preferably oriented polypropylene (OPP) and can be 50 or 70 ga.; the coextrusion of LDPE, LDPE can be 7 to 10#/ream LDPE, e.g.; white/black LDPE; and the coextrusion of HDPE HDPE, LLDPE can be a 1.75–2.25 mil blown coextrusion of white HDPE/white/black HDPE/orange LLDPE. In (iv) the polypropylene is preferably OPP, e.g., 50–75 ga., the LDPE can be 10#/ream, e.g., white/black LDPE; and, the coextrusion of HDPE, HDPE, LLDPE can be a 1.75–2.25 mil blow coextrusion as in (iii). And, (v) can be a 4 mil blown coextrusion of while HDPE/white/black HDPE/orange LLDPE. In this discussion it should be understood that PET means polyethylene terephthalate, LDPE means low density polyethylene, HDPE means high density polyethylene, LLDPE means linear low density polyethylene, EAA means ethylene acrylic acid, and EMA means ethylene methyl acrylate.

The present invention also provides an easy-open, tear control package. The packages can comprise multilayer or film structure which is folded and sealed together wherein, prior to said structure being folded and sealed to form said package, said film structure is laser scored with at least two substantially parallel, substantially straight or linear laser scores so that said package has a tear strip.

Alternatively, the package of the present invention can comprise a pouch, comprising multilayer or film structure sealed together such that the package has a front face and a rear face wherein on the outer surface of the said film structure, front and/or rear face of the resultant package at an isolated area which is to be at least a full width of said package and preferably adjacent to or near a seal, the said package is laser scored with at least two substantially parallel, substantially straight or linear laser scores. It is noted that an additional multilayer or film structure can be adhered to the inner surface of each face at or near an end of said package so that the package has an expandable side or bottom (FIG. 4A). This additional structure can fold between the faces when the open pouch is not filled; or, this structure can be lap sealed to the faces so that the bottom of the pouch is rounded.

Pouches of this invention can be used for food, medical supplies, blood or for any conventional uses of pouches. They can be used as retort pouches. They can also be employed in modified atmosphere packaging wherein the product to be contained within the pouch and/or the pouch are prepared under a sterile and/or inert atmosphere, and the product is packaged within the pouch under the same or similar conditions.

For instance, pouches of this invention can be used as packaging for beverages such as juices or for concentrates. When pouches of this invention are used for juice concentrates, it is preferred that the pouch have a third film so that the pouch can expand and hold a volume of fluid because after the end user has opened the package and emptied the contents therefrom, he can then use the pouch to measure and hold water for reconstituting the juice. And, as stated earlier, pouches of this invention can contain ingredients, be opened, have further ingredients added thereto and mixed therein, and then be further opened and used as a pan to bake in.

Likewise, in general, packages of this invention can be used for packaging anything, e.g., the embodiment of the present invention comprising a structure folded and sealed to make a package can be used to package soap. Note that any contents of a package or of a pouch of this invention is not to be a limitation of the invention. Further, it is noted that if a package of this invention is to be used for food, drugs, cosmetics, or the like, the constituents thereof, including any inks used in printing information on the package (e.g., as a layer of the film structure) should meet governmental regulations, e.g., FDA regulations.

Furthermore, a package, e.g., a pouch, of this invention can be made by forming, preferably extruding, a tube, e.g., of polymeric material and/or thermoplastic; laser scoring a circumferential area of the outer surface of said tube at at least one end thereof, said area corresponding to the width of the package to be formed and being on the front and/or rear faces of the resultant pouch; sealing one end of said tube to make an open pouch; filling said open pouch; and, sealing the open end. The laser scoring provides at least two substantially parallel, substantially straight or linear scores.

In all embodiments herein, the scores are preferably continuous, but need not be. The scores can be discontinuous, e.g., scores along a line can be two cuts or a series of cuts.

As to extrusion or coextrusion methods an apparatus for making multiple layer sheet materials, reference is made to commonly owned U.S. patent application Ser. Nos. 07/458,486, 07/458,487, and 07/458,488, all filed on Dec. 28, 1989, and each incorporated herein by reference. And, as to blended film structures, reference is made to commonly owned U.S. patent application No. 07/458,489, filed Dec. 28, 1989 and incorporated herein by reference. For further background on films and apparatus for producing them, reference is made to U.S. Pat. Nos. 3,477,099, 4,755,402, 3,558,330, 4,714,638, 4,842,791, 4,379,117, and 4,804,510 each of which being incorporated herein by reference.

While the preceding text and elsewhere herein speaks of "extruding", it should be understood that this invention is applicable to any process for forming films, film structures or laminates (which can then be formed into a package, preferably a pouch or a structure to be folded and sealed), including laminations, extrusions, coextrusion, blown extrusion, tubular water quench extrusion, extrusion coating, and the like, and combinations thereof. Likewise, the present invention is applicable to any process and apparatus for forming a package or for forming a pouch (so long as at least a width thereof, preferably adjacent to a seal thereof is laser scored on the outer surface with at least two scores so as to provide an easy open tear feature), including, a horizontal pouch forming machine and a vertical form, fill and seal machine.

Furthermore, in addition to the above-disclosed preferred multilayer or films structures, other films (of either single or multilayers), structures or laminates preferably comprising polymeric and/or thermoplastic materials can be formed into an easy-open tear control package (including pouch) in accordance with this invention. Suitable materials for such other films, structures or laminates or layers thereof can be almost any materials conventionally used in the art, e.g., metal foil, vinylidene chloride copolymers, polyethylene (PE), medium density polyethylene (MDPE), high density polyethylene (HDPE), low density polyethylene (LDPE, linear low density polyethylene (LLDPE), very low density polyethylene (VLDPE), polypropylene (PP), ultra linear low density polyethylene (ULDPE), propylene ethylene copolymer (PPE), MXD6, nylon, high impact polystyrene (HIPS), ethylene vinyl alcohol (EVOH), ethylene butene copolymers (EB), polyethylene terephthalate (PET), polybutylene terephthalate (PBT), copolymers of PET or of PBT or CoPET or CoPBT, ethylene vinyl acetate (EVA) (in which case preferably a high VA content EVA, i.e., about 28-35% by weight VA EVA), (E.g., Exxon LD-761 or, inks, primers or ionomer resins, e.g., Surlyn (Du Pont), or the like, or mixtures thereof. In multilayer films or laminates, for some applications, it may be preferred that at least one layer, such as an internal layer, comprise a barrier material.

In multilayer films, structures or laminates, a tie or an adhesive may also be present between the layers. suitable materials for such tie layers or adhesives are known to the ordinary skilled artisan and may include, by way of example, anhydride modified polyolefins, (e.g., graft copolymer of maleic anhydride and propylene wherein maleic anhydride moities are grafted onto polypropylene chains) ethylene acrylic acid copolymers, ethylene methyl acrylate copolymers, blends or copolymers of PP and EVA, or other synthetic resinous materials. The selected adhesive should be stable under the conditions by which the packages of the invention are prepared or used. For additional information on adhesives, reference is made to commonly owned U.S. patent application Ser. No. 07/458,489, filed Dec. 28, 1989. Commercially available products for layers in products of the invention include nylon 6; 11; 12; 6, 12; and 6, 66; ULTRAMIDKR 4600 (BASF), NOVAMID 2030 (Mitsubishi Chem. Co.), DURATHANE (Farbenfabriken Bayer A.G.), "1030" (Unitika, Japan) SYTEL SUPERTUFF 811 (Du Pont), "4018" (Huels, Germany), and ELY 1256 (Elmser, Switzerland), Mylar, Dalar, Exxon 5610A-2 (blend of PP containing EVA), Admer (Mitsui, No. AT469C), Bynel (Du Pont E361 or 3036), Plezar 3342, and Surlyn. Admer, Bynel and Plexar are believed to be Maleic anhydride modified polyolefins.

Films or layer in this invention, may be oriented, if desired, e.g., for a particular end use, by conventional processes, such as blown tubular orientation, stretch orientation, or molecular orientation. They may also be cross-linked by conventional processes such as by irradiation, heat, or the addition or cross-linking agents.

Vinylidene chloride copolymers as mentioned herein include vinylidene chloride vinyl chloride copolymers (VC, HB Sarans, Dow Chemical Co.), and vinylidene chloride methyl acrylate copolymers ("MA-PCDC copolymers") (MA Saran, Dow 119, Dow Chemical Co. and MA-PVDC copolymers containing essentially no EVA, See U.S. application Ser. No. 07/458,848, filed Dec. 28, 1989 and incorporated herein by reference). As to polyvinylidene chloride films and methods of making and using them, attention is further directed to commonly owned U.S. patent applications Ser. Nos. 07/458,485, 07/458,489, and 07/458,490, all filed on Dec. 28, 1989, and each incorporated herein by reference. In MA-PVDC copolymers, the methyl acrylate is preferably present in an amount of about 3 to 8% by weight, more preferably from 6 to 8% by weight, based upon total weight. However, the methyl acrylate content can be up to 12% and even up to 15% in some instances. vinylidene chloride copolymers, EVOH and metal, (e.g., aluminium foil), are useful as barrier layers in multilayer film structures. These materials can be employed as an additional internal layer in the preferred structures disclosed herein, e.g., between the second and third or between the third and fourth layers of the first film structure herein, or anywhere beneath the second layer in the alternative film structure disclosed herein.

However, rather than using ink or an ink layer for printing on packages or pouches of this invention, any appropriate printing process can be employed., e.g., a rewinder which imprints appropriate characters into the film comprising polymeric and/or thermoplastic material. Packages and pouches of this invention can be heat or adhesive sealed. It has been found that the laser scoring herein across the entire width of a package, including across side seal thereof, when present, does not weaken or reduce the air-tightness of the so scored side seals.

Throughout this specification, reference has been or will be made to multilayer structures, films, film structures or laminates. These multilayer or film structures, films or laminates are the same thickness as conventional multilayer structures, films, film structures or laminates. Typical thicknesses of films and film structures can range from about 2.0 mils (0.051 mm) to 5 mils or more, with a normal range of about 0.5 to about 5.0 mils, preferably about 1.5 to about 3.0 mils (0.038–0.076 mm). Films thinner than about 1.5 mils (0.038 mm) may be too weak to perform their required function (although individual layers of multilayer structures may be thinner than about 1.5 mils, e.g., about 0.25 to about 1 mil). Laminates can be up to 10 mils thick and multilayer structures can include films, (even single layer films) film structures and laminates and can be up to 100 mils thick. "Structure" includes multilayer structure as used herein. A container from a multilayer structure can have an average thickness of about 30 mils.

As is well known, a laser is a device which emits a powerful, concentrated beam of light. The beam is stimulated, amplified, electromagnetic radiation and is made up of light waves all of which are, for all practical purposes, coherent, i.e., in phase, and monochromatic, i.e., of the same wavelength. Each laser is usually named according to the particular lasing medium which it employs, and, depending on the particular atomic structure of that medium. each laser emits its own specific and characteristic wavelength, i.e., one of a well defined frequency. Laser wavelengths can range from about 0.2 to about 40 microns and their frequencies from about $1.5 \times 10^{15}$ to about $0.75 \times 10^{13}$ cycles per second.

Laser light waves transport great energy. The power available from such energy can range from a fraction of a watt to many thousand watts. The intensity of the energy, i.e., the amount that flows per second across a unit area of material perpendicular to the beam, can be varied and controlled by, for example, varying the focus of the beam according to various known methods.

The energy of a laser beam is transported according to the output pattern or mode structure of the beam. A beam can have a single or multimode structure. A beam of single mode output, has all its energy in a single hot spot with an intensity distribution that follows a gaussian curve when the intensity points are taken along a line perpendicular to the axis of the beam. A multimode beam is comprised of a series of rings and/or spots symmetrical about the beam axis. The single mode beam can be focused to a smaller spot diameter than the multimode beam. Such a spot has very high intensity and is therefore the most valuable for cutting and scoring.

Laser radiation is of two types, pulsed and continuous. The former involves short, relatively high powered pulses or emissions which can span, for peak pulses, from about 15 nanoseconds to about 1 millisecond, and for standard control pulses, from about 1 millisecond to greater than one second. Continuous or steady-rate emissions are preferred for industrial use because they transport a substantially greater amount of total energy.

Examples of several types of lasers available for industrial use are: gaseous lasers such as carbon dioxide or helium-neon; solid state light pumped lasers such as ruby, neo-dymium-yttrium aluminium garnet (Nd-YAG), or glass; semi-conductor lasers such as gallium arsenide, and plastic lasers and lasers using conjugated organic molecules such as benzene, toluene or napthalene.

Although the source of radiant energy can be any source capable of providing radiant energy of sufficient intensity to form the aforementioned plurality of scores in a multilayer structure according to the method of this invention, the preferred source is a laser. Although many lasers are capable of emitting a beam of radiant energy of such an intensity, it has been found that for commercially forming preferential, easy opening tear scores in multilayer laminate packaging materials, a laser whose beam is focusable to a small spot size or diameter is most suitable. A small spot size is desirable because energy therein contained is so concentrated that a small, precise volume of laminate material can be rapidly heated, vaporized or other-wise degraded in manner that effects a clean cut or score line without affecting adjacent areas of the material.

The wavelength of the laser beam can be any wavelength whose relationship to the absorptive characteristics of the materials of the multilayer structure is such that it will be selectively absorbed in at least one preselected layer in a manner that will effect suitable scores in that layer and in the composite laminate. The frequency of the radiation and other laser and beam characteristics such as the output power of the laser and mode structure and spot size of the beam, can be any combination which will provide a beam of radiant energy of the aforementioned sufficient intensity to effect the aforementioned plurality of scores. For the purpose of this invention, a score is any alteration in the structure along a predetermined path in one or more layers of the multilayer structure or laminate which allows the multilayer structure to be preferentially torn, or otherwise manipulated (for opening) along that path in a manner that was not possible without the scores (and without employing a cutting instrument).

The output power of the laser can conceivably be of any wattage. High wattages are preferred for example when it is desired that the laser emit a plurality of beams. Thus, laser power can be in the range of up to about 500 watts in order to permit simultaneous use of say, five 100 watt beams or ten 50 watt beams. Multiple beams can be produced by any of the known means such as beam splitting by partial reflectors. Generally, the beam power used is varied depending on the thickness of the multilayer structure or laminate being worked and the relative motion between the beam and the workplace. For example, it has been found that for multilayer thermoplastic laminates of up to about 3.0 to 5.0 mils, it is advantageous to use beams of about 2 to 100 watts, preferably about 2 to 50 watts.

Either pulsed or continuous laser beams can be utilized according to the method of this invention. Pulsed beams can be employed for forming dashed or discontinuous scores, but continuous beams are preferred when continuous easy open tear scores are desired. Continuous beams are also preferred because they can subject laminates to a greater total amount of energy.

The mode structure of the laser beam can be single or multiple but single mode beams are preferred because their energy is more concentrated and because they are focusable to smaller sport diameters.

The laser beams preferably are focused but can be unfocused. The diameters of the spot to which a laser beam is focused to effect a satisfactory score according to this invention can be of any suitable dimension, depending, inter alia, on the thickness of the laminate layers and the type of degradation and the characteristics of the score desired. Although spots of beam of short wavelengths can be focused to sizes less than 1 micron in diameter, the minimum spot size for a carbon dioxide laser having a wavelength of 10.6 microns, can range from about 2.0 to 10.0 mils depending on beam mode structure and lens focal length. It has been found that for forming the preferential tear scores of this invention in relatively thin multilayer laminates having a total thickness of up to about 3.0 to 5.0 mils, a minimum spot diameter is preferred. For the carbon dioxide laser, preferred spot sizes are from about 2.0 to 3.0 mils. For purposes of this invention, a multilayer polymeric laminate includes a laminate having at least one layer which is polymeric, and multilayer thermoplastic laminate includes one having at least one thermoplastic layer. Usually, at least one layer is polymeric. Both multilayer polymeric laminates and multilayer thermoplastic laminates are included within the terms laminate and multilayer structure.

Any suitable lens capable of focusing beams to the aforementioned small spot sized can be utilized with the lasers of this invention. Lenses having short focal lengths are preferred because they provide the desired small spot sizes. A variety of materials known to the art are available for use as such lenses depending on the wave-length to be transmitted there through. For example, germanium, gallium arsenide or sodium chloride lenses can be used with the carbon dioxide laser.

An example of a suitable laser which possesses the aforementioned characteristics and which has been successfully utilized according to this invention to form a preferential easy open tear feature in multilayer thermoplastic laminates of a thickness of up to about 3.0 to 5.0 mils is a carbon dioxide flowing gas laser having a power range of up to 25 watt and emitting a continuous single-mode beam having a wavelength of 10.6 microns focused to a spot diameter of about 2.0 mils by a 1 inch focal length germanium lens. The lens was fitted with a coaxial air nozzled to prevent debris from striking the lens and to clear out evolving gases in the vicinity of the scores begin formed. Another example of a suitable laser is the aforementioned neodymium-yttrium aluminium garnet laser which could have a wavelength as short as 1.06 microns.

Vaporization is commonly believed to be the manner in which a laser beam effects a score line in a layer of material. When there is relative movement along a predetermined path between a laser beam of a particular wavelength and a layer of a material partly transparent to that wavelength, energy the width of the diameter of the beam and more concentrated at is center, is absorbed into the material. In thermoplastics for example, as the energy is absorbed it is transformed into heat which softens and melts the material along the beam path. Toward the center of the beam path where the intensity is greater, some of the thermoplastic molecules are vaporized and the resulting expanding gases form the score lines in the material. If the molecules that are vaporized are at the surface of the material, their gases leave cavities as they rise directly into the atmosphere. If the vaporized molecules are not on the surface, their gases form bubbles which rise through, blow out, or even, if the energy density is great enough, explode through surrounding and/or overlying melted material. As the expanding bubbles form and rise, they mechanically move molten material out of the way. Under proper conditions, e.g., when a beam of sufficient intensity is subjected to a material for a sufficient time, enough molecules are vaporized along a line such that resulting bubbles merge, coalesce, or otherwise cooperate to form a score line or groove. The material moved by the bubbles forms a slightly protruding bead along the surface of each of the groove's upper longitudinal edges. Although most of the bubbles which form the score line result from vaporization of thermoplastic material, some bubble sites apparently result from hot spots caused by highly absorbent impurities such as dirt or metals and from entrapped moisture or gases normally present for example in molecular lattice structures and grain boundaries of the thermoplastic. The size and distribution of bubbles occurring in a material depend on several factors including the intensity of the beam, the time it impinges an area of the material and the characteristics of the material itself.

Where vaporization of molecules occurs in a material, i.e., at its surface or within its thickness, depends on the coefficient of absorption as applied in the exponential absorption law and on the termal diffusivity and conductivity of the material. Vaporization will first occur mostly at or near the incident surface and will proceed downward increment into materials having a high coefficient, whereas it will occur fairly uniformly though the thickness of those having a low coefficient of absorption. It has been found difficult to groove and, leave sufficient residual material in thin layers of material having a low absorption coefficient because their fairly uniform manner of vaporization requires highly critical control of processing conditions such as material beam exposure time.

As for relative positioning of the layers selected to comprise the multilayer structures, e.g., laminates of this invention, the more absorbent or absorptive layer, i.e., the one having the highest coefficient of absorption, can be at any level in the structure. When the multilayer structure includes a more absorbent, i.e., absorptive, layer proximate to the source and a less absorbent underlying layer, the scores or cuts can be safely effected by vaporization of the proximate layer without substantial danger of affecting or cutting completely through the underlying layer of the structure. This is because any excess energy due to, for example, excess exposure time will substantially pass through the under-lying less absorbent layer.

When the relatively more absorbent layer is in an interior position and is covered by one or more, less absorbent polymeric or composite materials and backed by a least absorbent layer, the scores can be formed in the multilayer structure by vaporization solely of the more absorbent inner layer or of it and other layers. The laser beam penetrates the overlying layers perhaps somewhat affecting them and vaporized the inner layer without materially affecting the backing layer. Bubbles forming therein could for example be entrapped between the outer layers to form cavitous scores, or could flow out through the softened molten or partially vaporized upper layer or layers.

When the more absorbent layer is least proximate to the source and overlying layers are less absorbent, the scores can be formed by a beam which penetrates and loses some energy to but may not substantially affect at least one of the overlying layers but which has sufficient energy left to vaporize the least proximate, absorbent layers. With this combination of layers, vaporized gases could escape for example through the undermost surface of the least proximate layer or through overlying layers. The escape of such gases can be used to cooperate with the scores to form easy opening tearing means such as tear strips and pull tabs. For example, the escape can aid in the delamination of layers or the overcoming of a seal along a certain path between layers and can thereby cooperate with one or more adjacent or parallel scores to provide the easy opening feature. Of course, the scores can without the use of escaping gases, cooperate with a package seal to aid in the releasing of one or more sealed layers from one or more adjacent layers in an easy opening manner.

In the aforementioned case in which a less absorbent layer overlies a more absorbent layer, there may be multilayer structures in which the less absorbent layer absorbs more energy than the highest coefficient layer. For example, in a structure which is a laminate, a less absorbent material such as polyethylene may be sufficiently thick to absorb a greater amount of energy than a more absorbent underlying layer of polyvinyl alcohol. In such a laminate, vaporization of the polyvinyl alcohol forms scores, and, gases from such vaporization aid in forming scores in the less absorptive polyethylene layer and in the laminate.

The operating conditions and parameters for employing the methods of this invention can vary widely generally depending on such aforementioned factors as the type of laser used, the wavelength, frequency, power, continuity, mode structure and focusability of the beam, and the characteristics of the scores desired and the characteristics and intended use of the multilayer structure of laminate. When the above factors have been considered and the required scores specified for the given multilayer structure of laminate, the processing parameters can then be defined in terms of beam intensity in watts/in$^2$ and exposure time in ft/mm.

Beam intensity is determined by beam power and spot diameter. For example, a carbon dioxide laser beam of 25 watts power can have a beam intensity of about 3.5 megawatts/in.$^2$ when focused to a spot diameter of about 3.0 mils. If spot diameter is held constant, intensity is directly determined by power. If, as usually is the situation, the intensity, i.e., both spot diameter and power, is held constant, exposure time determines the total amount of energy delivered to a given amount of material. Exposure time is determined by rate of relative movement between the laser beam and the multilayer structure or laminate.

Relative movement assures that exposure time is not excessive, i.e., that the laser beam does not linger on and cut completely through the multilayer or film structure being worked. It also allows scores to be formed along any predetermined path of any direction or configuration. Either the laser beam or the structure or both can be moved in relation to each other along the path. Preferably, the structure is passed under a stationary beam. For forming scores in continuous lengths of flexible multilayer thermoplastic package substrates comprising laminates, it has been found convenient to place one or more stationary lasers at the end of a laminating line or at the end of the sealing line so that its beams produce desired lines along the length of the "open package" multilayer laminate sheet or along the length of the laminate or multilayer sheet as it is being wound from a roll onto another wind up roll. The motion can be at any suitable rate for a particular selected combination of the forementioned factors. More particularly, the rate of speed is controlled and is correlated with beam intensity, with coefficients of absorption of the layer or layers of the structure, especially the most absorptive thereof, and with the type and depth of scores desired. Examples of ranges of processing speeds and of how to alter the same are set forth in U.S. Pat. Nos. 3,909,582 and 3,790,744.

Referring now to the Figures, FIGS. 1-3 show apparatus for scoring packaging substrates in accordance with the present invention. Packaging substrate 10' is in roll form and is being conveyed by rollers 15 and 20 to laser beams 30 or 30' and 30" which accordingly score substrate 10' to form scored substrate 10. A wind up roll for collecting scored substrate 10 is not shown. Lasers 25 (FIG. 1) provide three scores; Lasers 25' (FIG. 2) provides two scores; and, Laser 25" (FIG. 3) provides two scores by having its beam 30 pass through beam splitter 35 which can be a semi-transparent mirror to produce beams 30' and 30". Beam 30" is directed to substrate 10' by mirror 40. Beams 30' and 30" can be mirror split and the mirror beams therefrom directed to substrate 10' by the use of additional beam splitters and mirrors appropriately positioned.

FIG. 4 shows package 100 of the invention, bearing phantom writing 110. From the view shown, face 105 is visible. A second face is below face 105; said second face is sealed to face 105 at edges 120, 120' and 120" which are sealed. Across the full width of package 100, including across two side sealed edges 120', run laser scores 125 and 125'. Note that laser scores 125 and 125' are near or adjacent to sealed edge 120 and are between sealed edges 120 and 120". Area 126 lies between laser scores 125 and 125'and is a tear strip. An end user tearing at area 126 will find that package 100 easily opens thereat. Phantom writing 110 can include instructions to tear at area 126 as well as directions with respect to any contents within package 100.

To produce package 100 from a substrate 10' such as shown in FIGS. 1-3, it is preferred that the substrate 10' be made by forming face 105 and the second face (not shown), including applying thereto any printing or writing which is to appear thereon (such as phantom writing 110); that said faces be aligned and sealed at edges 120' and 120"; and that the then resulting substrate 10' be subjected to laser scoring as shown in FIGS. 1-3 to produce scored substrate 10. Individual open packages are then cut from scored substrate 10, filled and sealed at edge 120.

FIG. 4A shows a package 200 which is similar to package 100 of FIG. 4, except that in addition to face 105 and the second face (not shown) there is a third structure, bottom 205 which is sealed to face 105 and the second face at edges 220 and 220. Bottom 205, when package 200 is empty, can fold and be positioned between face 105 and the second face so that package 200, when empty, lies substantially flat. Alternatively, bottom 205 can project outwardly from face 105 and the second face such that the package would have a rounded bottom. Bottom 205 allows package 200 to expand, e.g., when filled.

Figure 4B:
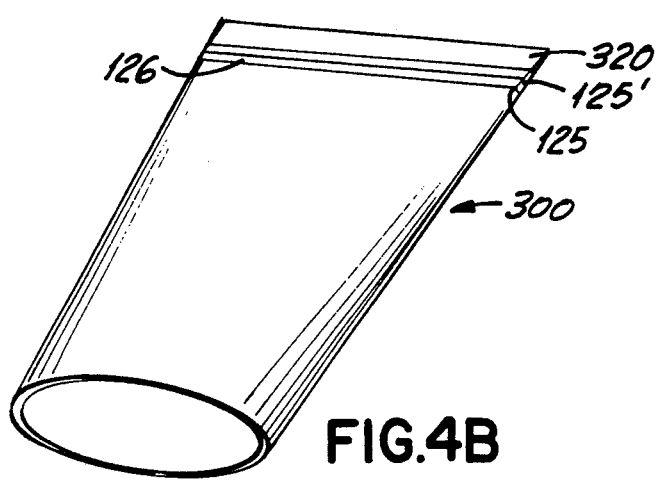

FIG. 4B shows open package 300 of the present invention formed from a tube. Open package 300 bears laser scores 125 and 125' and area 126 as well as sealed edge 320.

Turning to FIGS. 5A-5F, FIGS. 5A and 5B show package 400, which bears phantom writing 410, and has top face 405 and pan base 406. Top face 405 is peelably sealed to pan base 406 at side seal edges 420"; Pan base 406 is also affixed to top face 405 at top seal 420. Seals 420'and 420" seal between pan base 406 and top face 405 bottom 505 which is akin to bottom 205 FIG. 4A. Package 400 is provided with laser scores 125, 125', 125", and 125'". Area 126 is between laser scores 125 and 125' and, area 126' is between laser scores 125" and 125'". Surface 406' is the outside, bottom surface of pan base 406.

The use of package 400 is shown in FIGS. 5C-5F. In FIG. 5C, area 126 has been torn at, thereby opening package 400 at opening 450. Note that scores 125 remains with package 400, score 125" comes off with portion 460 and that area 126 is divided between package 400 and portion 460. Scoring packaging substrates in accordance with this invention provides packages which open substantially as illustrated herein.

Package 400 is then positioned with opening 450 facing up (FIG. 5D). Additional ingredients 500 can be added into package 400 (FIG. 5D) which can even be formed to stand on its own by bottom 505 opening (like bottom 205 is opened shown in FIG. 4A). The ingredients within package 400 can even be subjected to mixing, e.g., from mixer 600. (FIG. 5E).

Thereafter, the end user carefully sets package 400 onto the bottom surface 406' of base pan 406 (FIG. 5B), allowing the ingredients to settle into base pan 406. The end user then tears at area 126' to further remove top face 405; and, to fully remove it, peels away side seal edges 420'" to be left with base pan 406 containing the mixed ingredients. (FIG. 5F).

If base pan 406 is of metal, it can go directly into a conventional oven. If base pan 406 is of a non-metal, e.g., a thermoplastic material, or polymeric material (e.g., a multilayer structure or laminate), it can go directly into a microwave oven. With respect to pouch and pan or tray-like structures which are microwaveable and materials for making the same, reference is made to U.S. Pat. No. 4,355,721, incorporated herein by reference.

Figure 6:
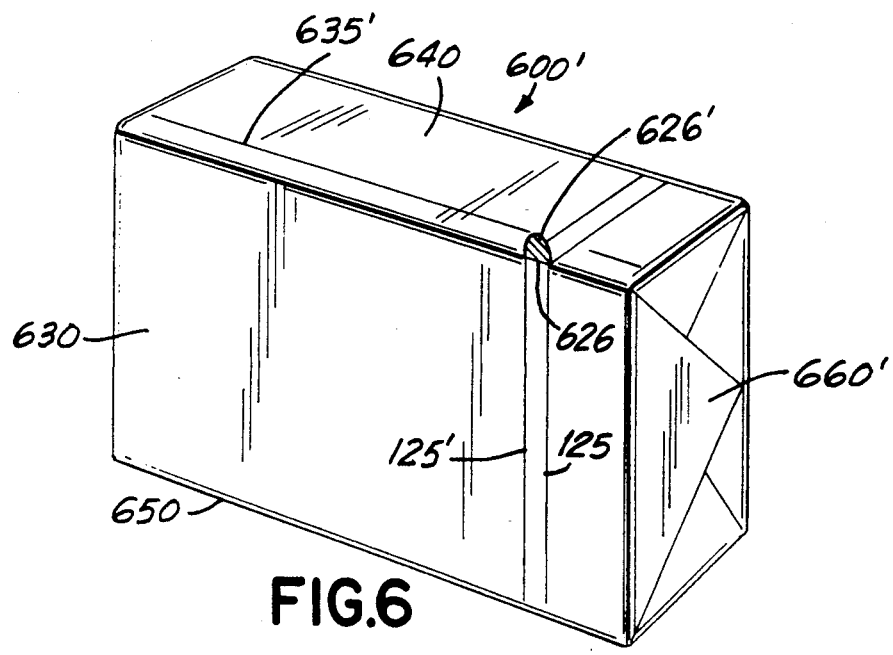
FIG. 6 shows a package of the present invention.
Figure 7:
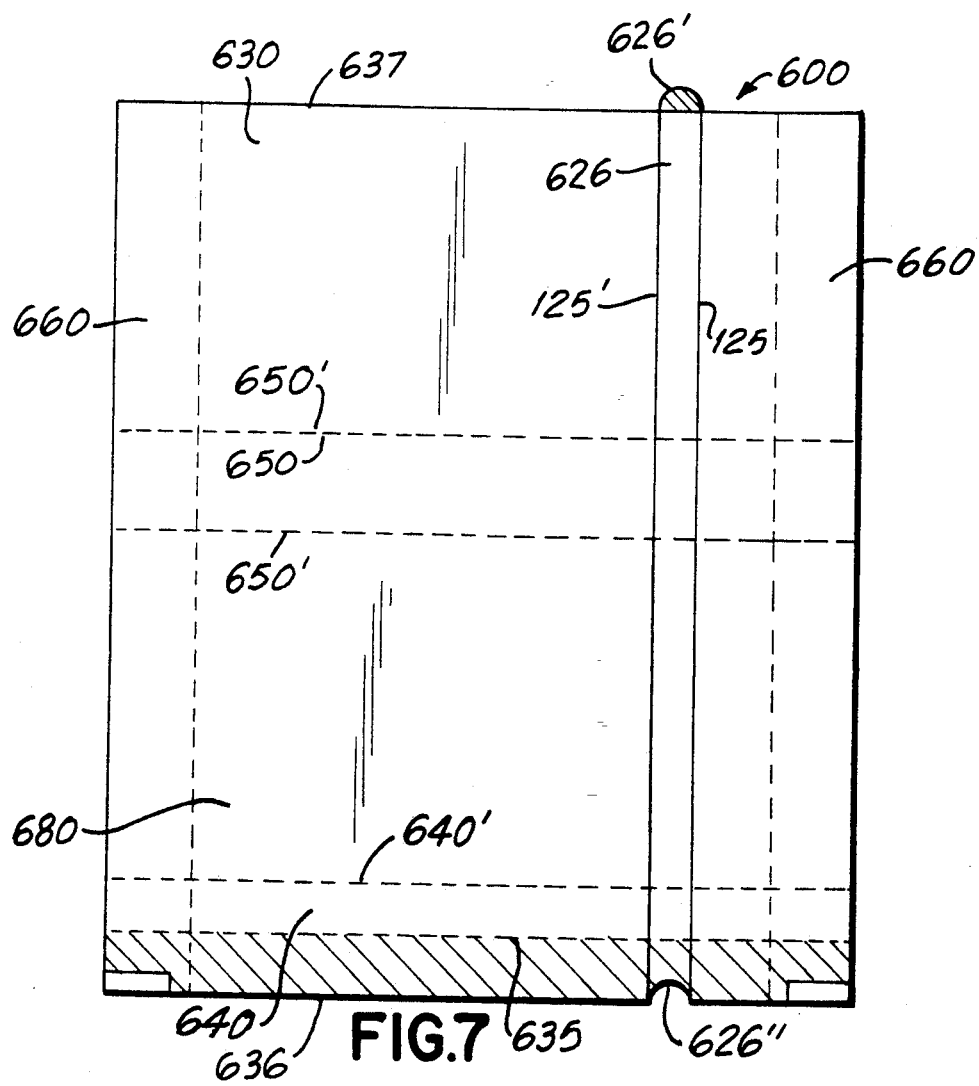
FIG. 7 shows a sheet for a package of FIG. 6.

FIG. 7 shows a packaging substrate 600 for the fold and seal embodiment of the present invention. Packaging substrate 600 is shown in the folded and sealed condition, i.e., as package 600' in FIG. 6. Packaging substrate 600 has laser scores 125 and 125"; the area between these scores being tear strip 626. Areas where packaging substrate 600 is either folded or sealed are set off with borders of dotted line. When packaging substrate 600 is folded and sealed into packaging substrate 600, area 635 is folded underneath area 630 and the package is sealed together thereat; the package is also folded and sealed together at side areas 660, to make respectively seals 635' and 660' (FIG. 6). Further, packaging substrate 600' is resting upon area 650 with area 630 facing the viewer. Area 680, in FIG. 6 is within the plane of the paper. And, area 640 is at the top of package 600'. Packaging substrate 600 can be formed as a continuous sheet and scored as shown in FIGS. 1-3. When so formed, individual substrates, as shown in FIG. 7, are cut from the continuous sheet at lines 636 and 637. Note that line 636 is substantially straight, except for the cut out 626' which forms the tab of the tearstrip of the preceeding sheet. And, line 637 is substantially straight, except, for the tab 626' which protrudes therefrom. Note that tab 626' can also protrude from package 600'. The distance between lines 636 and 637 can be considered the width of packaging substrate 600.

Areas such as 630, and/or 680 can bear printing, e.g., instructing the end user as to the contents of package 600' or as to how to use tear strip 626 (e.g., "pull at tab [626']"). It is preferred that packaging substrate 600 be fully formed, including any printing thereon, prior to applying laser scores 125 and 125'; or, in other words, it is preferred that laser scoring occur immediately prior to folding and sealing packaging substrate 600 into package 600'.

Having this described in detail preferred embodiments of the present invention, it is to be understood that the invention defined by the appended claims is not to be limited by particular details set forth in the above description as many apparent variations thereof are possible without departing from the spirit or scope of the present invention.

What is claimed is:

1. An easy open pouch comprising structure sealed together such that the resultant pouch has a front face and a rear face and each face has an inner surface and an outer surface, wherein on the outer surface of said structure, front and/or rear face of the resultant pouch, at an isolated area which is full width of said resultant pouch and adjacent to at least one seal, is at least two substantially.parallel, substantially straight or linear, laser scores, wherein said front face and/or said rear face comprises film structure and said film structure comprises, a plurality of superimposed layers which comprise from outer layer to inner layer: a first layer comprising polyester, a second layer comprising polyethylene, a third layer comprising high density polyethylene, and a fourth layer comprising linear low density polyethylene.

2. An easy open pouch comprising structure sealed together such that the resultant pouch has a front face and a rear face and each face has an inner surface and an outer surface, wherein on the outer surface of said structure, front and/or rear face of the resultant pouch, at an isolated area which is full width of said resultant pouch and adjacent to at least one seal, is at least two substantially parallel, substantially straight or linear, laser scores, wherein said front face and/or said rear face comprises film structure and said film structure comprises, a plurality of superimposed layers which comprise from outer layer to inner layer: a first layer comprising polyester, a second layer comprising polyethylene, a third layer comprising polyester, a fourth layer comprising polyethylene, a fifth layer comprising a sealant film and a sixth layer comprising linear low density polyethylene.

3. The pouch of claim 2 wherein the second and a fourth layers each comprise low density polyethylene, and, the fifth and sixth layers comprise a coextrusion such that the fifth layer comprises a plurality of layers each comprised of high density polyethylene.

4. The pouch of claim 3 wherein there is an ink layer disposed between the first and second layers, and the fifth layer comprises two layers of high density polyethylene, such that the film structure comprises, from outer layer to inner layer: a first layer comprising polyester; an ink layer; a second layer comprising low density polyethylene; a third layer comprising polyester; a fourth layer comprising low density polyethylene; a fifth layer comprised of two layers of high density polyethylene; and, a sixth layer comprising linear low density polyethylene.

5. An easy open pouch comprising structure sealed together such that the resultant pouch has a front face and a rear face and each face has an inner surface and an outer surface, wherein on the outer surface of said structure, front and/or rear face of the resultant pouch, at an isolated area which is full width of said resultant pouch and adjacent to at least one seal, is at least two substantially parallel, substantially straight or linear, laser scores, wherein said front face and/or said rear face comprises film structure and said film structure comprises, a plurality of superimposed layers which comprise from outer layer to inner layer: a first layer comprising polyester, a second layer comprising a coextrusion, a third layer comprising a barrier material, and a fourth layer of a sealant material.

6. The pouch of claim 5 wherein the second coextrusion layer comprises a plurality of superimposed layers which comprise from the first layer of the film structure to the third layer of the film structure: a layer of low density polyethylene, and, a layer of ethylene acrylic acid; and, wherein the barrier material is comprised of foil; and, the sealant material is comprised of ethylene methyl acrylate.

7. The pouch of claim 6 wherein disposed between the first and second layers is an ink layer; and, disposed between the third and fourth layers is a layer comprising primer.

8. An easy open pouch comprising structure sealed together such that the resultant pouch has a front face and a rear face and each face has an inner surface and an outer surface, wherein on the outer surface of said structure, front and/or rear face of the resultant pouch, at an isolated area which is full width of said resultant pouch and adjacent to at least one seal, is at least two substantially parallel, substantially straight or linear, laser scores, wherein said front face and/or said rear face comprises film structure and said film structure comprises, a plurality of superimposed layers which comprise from outer layer to inner layer: a first layer comprising oriented polypropylene, a second layer comprising at least one layer of low density polyethylene, and a third layer comprising a coextrusion, said coextrusion, comprising a plurality of superimposed layers which comprise from the second layer of the film structure to the inner layer of the film structure: a first layer of high density polyethylene, a second layer of high density polyethylene, and, a third layer of inner low density polyethylene.

9. The pouch of claim 8 wherein the second layer of the film structure comprises a coextrusion comprising a plurality of layers comprising low density polyethylene.

10. The pouch of claim 9 wherein the second layer of the film structure comprises a coextrusion comprising two layers, each comprising low density polyethylene.

11. The pouch of claim 10 wherein disposed between the first layer of the film structure and the second layer of the film structure is an ink layer.

12. An easy open pouch comprising structure sealed together such that the resultant pouch has a front face and a rear face and each face has an inner surface and an outer surface, wherein on the outer surface of said structure, front and/or rear face of the resultant pouch, at an isolated area which is full width of said resultant pouch and adjacent to at least one seal, is at least two substantially parallel, substantially straight or linear, laser scores, wherein said front face and/or said rear face comprises film structure and said film structure comprises, a plurality of superimposed layers which comprise from outer layer to inner layer: a first layer comprising high density polyethylene, a second layer comprising high density polyethylene, and, a third layer comprising linear low density polyethylene.

13. The pouch as in one of claims 1-12 wherein the scores are on the both front and the rear faces.

14. The pouch of any one of claims 2-4 or 8-12, wherein the laser scores are adjacent to a first seal, and opposite that seal is a second seal and a third seal and an additional structure, wherein said second seal joins the inner surface of said front face to said additional structure and said third seal joins said rear face to said additional structure so that said pouch has an expandable side or bottom.

15. The pouch of claim 14 additionally comprising at least two substantially parallel, substantially straight or linear laser scores, across the full width of said pouch, adjacent to said second and third seals.

16. The pouch of claim 15 wherein said rear face comprises a pan.

17. The pouch of any one of claims 1-12 wherein the film structure is a tube.

18. The pouch of any one of claims 1, 5, 6 or 7 wherein the laser scores are continuous.

19. The pouch of claim 14 wherein the laser scores are continuous.

20. The pouch of claim 19 wherein the laser scores cut through the first and second layers of the film structure.

21. A package having an easy open feature comprising film structure folded and sealed together to form said package, wherein, prior to said structure being folded and sealed, said film structure is laser scored with at least two substantially parallel, .substantially straight or linear laser scores along a full width of said film structure so as to form said easy tear open feature which comprises a tear strip; and, wherein said film structure comprises a plurality of superimposed layers which comprise from outer layer to inner layer: a first layer comprising polyester, a second layer comprising low density polyethylene, a third layer comprising polyester, a fourth layer comprising low density polyethylene, and, a fifth layer, a sixth layer and a seventh layer; said fifth and sixth layers each are comprised of high density polyethylene, the seventh layer is comprised of linear low density polyethylene; and, the fifth, sixth and seventh layers are a coextrusion.

22. A package having an easy open feature comprising film structure folded and sealed together to form said package, wherein, prior to said structure being folded and sealed, said film structure is laser scored with at least two substantially parallel, substantially straight or linear laser scores along a full width of said film structure so as to form said easy tear open feature which comprises a tear strip; and, wherein said film structure comprises a plurality of superimposed layers which comprise from outer layer to inner layer: a first layer comprising polyester, a second layer comprising polyethylene, a third layer comprising high density polyethylene, and a fourth layer comprising linear low density polyethylene.

23. A package having an easy open feature comprising film structure folded and sealed together to form said package, wherein, prior to said structure being folded and sealed, said film structure is laser scored with at least two substantially parallel, substantially straight or linear laser scores along a full width of said film structure so as to form said easy tear open feature which comprises a tear strip; and, wherein said film structure comprises a plurality of superimposed layers which comprise from outer layer to inner layer: a first layer comprising polyester, a second layer comprising low density polyethylene, a third layer comprising ethylene acrylic acid; a fourth layer comprising foil, and a fifth layer comprising ethylene methyl acrylate.

24. A package having an easy open feature comprising film structure folded and sealed together to form said package, wherein, prior to said structure being folded and sealed, said film structure is laser scored with at least two substantially parallel, substantially straight or linear laser scores along a full width of said film structure so as to form said easy tear open feature which comprises a tear strip; and, wherein said film structure comprises a plurality of superimposed layers which comprise from outer layer to inner layer: a first layer comprising oriented polypropylene, a second layer comprising at least one layer of low density polyethylene, and a third layer comprising a coextrusion; said coextrusion, comprising a plurality of superimposed layers which comprise from the second layer of the film structure to the inner layer of the structure: a first layer of high density polyethylene, a second layer of high density polyethylene, and, a third layer of linear low density polyethylene.

25. A package having an easy open feature comprising film structure folded and sealed together to form said package, wherein, prior to said structure being folded and sealed, said film structure is laser scored with at least two substantially parallel, substantially straight or linear laser scores along a full width of said film structure so as to form said easy tear open feature which comprises a tear strip; and, wherein said film structure comprises a plurality of superimposed layers which comprise from outer layer to inner layer: a first layer comprising high density polyethylene, a second layer comprising high density polyethylene, and, a third layer comprising linear low density polyethylene.

26. The package of any one of claims 21-25 wherein said tear strip has a tab.

27. The package of claim 26 wherein the laser scores are continuous and cut through said first and second layers of the film structure.

* * * * *